G. Hinman,
Knife Sharpener.
N° 22,919.   Patented Feb. 8, 1859.
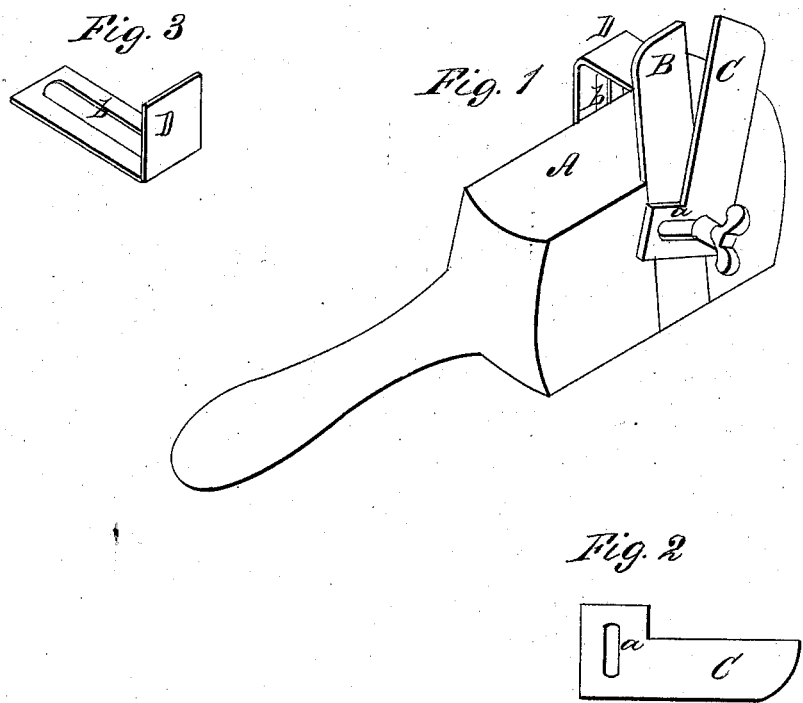
Witnesses;
S. Thompson
R. Fitzgerald
Inventor;
George Hinman

UNITED STATES PATENT OFFICE.

GEO. HINMAN, OF NEW HAVEN, CONNECTICUT, ASSIGNOR TO HIMSELF AND CHAS. MONSON, OF SAME PLACE.

KNIFE-SHARPENER.

Specification of Letters Patent No. 22,919, dated February 8, 1859.

*To all whom it may concern:*

Be it known that I, GEORGE HINMAN, of the city and county of New Haven, in the State of Connecticut, have invented a new and useful Improvement in Knife-Sharpeners as a new Article of Manufacture; and I do hereby declare that the following is a full, clear, and exact description of the construction, character, and operation of the same, reference being had to the accompanying drawings, which make a part of this specification, in which—

Figure 1 is a perspective view of the whole apparatus. Fig. 2 is a plan of the adjustable cutter. Fig. 3 is a perspective view of the rest.

My improvement consists in making one of the cutters adjustable, by means of a slot, working on a screw, or pin, so that I am able to use any portion of the cutting edges at any desired angle, so that I may sharpen a knife by abrading both sides of its edge, at any desired angle, from the most acute, or thin edge to the most obtuse or thick edge; and in using a rest of brass, or any other suitable substance, to enable me to effect the slightest possible abrasion on the edge of the knife, so as to leave a very fine, and delicate edge.

I make the handle, A, of wood or any other suitable material, substantially in the form shown in Fig. 1.

I make the cutters B, and C, of cast steel, or any other suitable material, substantially, as shown in Figs. 1, and 2, beveling the adjacent edges (in the usual way for knife sharpeners) suitable for abraiding, or cutting away, the substance of the edge of the knife on both sides, so as to form a keen cutting edge.

In the lower end of the movable cutter C, I cut, or form a slot, as seen at *a*, Fig. 2, (through which the screw passes to tighten the cutters and rest,) so that by means of this slot, *a*, I am able to adjust the blade, C, in such a manner, that, at any portion of the length of the cutting, or abrading edge, the cutters may be kept, or placed, at any desired angle to give the edge of the knife the desired acuteness.

I make the guard, or rest, D, Figs. 3 and 1, of sheet brass, or any other suitable material, with a suitable slot, as shown at *b*, Fig. 3, so that it may be adjusted to the proper height to suit the position of the cutting edges desired to be used, for the purpose of supporting the knife blade, and allowing the operator to cut as fine a shaving from the edge of the knife blade as he may desire.

To use this sharpener, I fit the cutters B, and C, to the stock, or handle, A, in such a manner that I can adjust the blade, or cutter, C, so as to form any desired angle with the cutter, B, in any position of the length of the cutting edges;—and adjust the rest, D, to the proper position for the edge of the knife to rest on;—and in connection with the rest, D, (or without it,) if thought advantageous, I can use a guide, to rest, or press, one side of the knife blade against, on one side, to insure the proper direction for drawing the knife.

I am aware that two cutting edges, set at different angles have been used for knife sharpeners for many years, (but in all such cases the angle varied as the cutting edges were more or less separated at the upper ends.) I, therefore, do not claim a knife sharpener made of two pieces of steel with the edges fitted to abrade the sides of the edge of the knife, as such, as my invention, but,

What I claim as my invention, and desire to secure by Letters Patent, is—

1. The use of the two cutters, (B, and C,) when made susceptible of being adjusted to any desired angle, by means of a slot, (as at *a*,) while using any portion of the length of the cutting edges, and the whole is constructed, and made to operate, substantially, as herein described.

2. I also claim the rest, (D,) in combination with the adjustable cutters, (B, and C,) when the whole is constructed, and fitted for use, substantially, as herein described.

GEORGE HINMAN.

Witnesses:
S. THOMPSON,
R. FITZGERALD.